(12) United States Patent
Jeong et al.

(10) Patent No.: US 10,931,925 B2
(45) Date of Patent: Feb. 23, 2021

(54) MONITORING CAMERA HAVING AUTOFOCUSING FUNCTION BASED ON COMPOSITE FILTERING ROBUST AGAINST CHANGE IN VISIBILITY STATUS AND VIDEO MONITORING SYSTEM EMPLOYING SAME

(71) Applicant: ESCA(ELECTRONIC SECURITY OF THE CREATIVE ASSOCIATION) CO., LTD., Gyeonggi-do (KR)

(72) Inventors: Tae-woong Jeong, Chungcheongnam-do (KR); Jeong-il Kim, Incheon-si (KR)

(73) Assignee: ESCA(ELECTRONIC SECURITY OF THE CREATIVE ASSOCIATION) CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/482,699

(22) PCT Filed: May 8, 2017

(86) PCT No.: PCT/KR2017/004737
§ 371 (c)(1),
(2) Date: Jul. 31, 2019

(87) PCT Pub. No.: WO2018/159896
PCT Pub. Date: Sep. 7, 2018

(65) Prior Publication Data
US 2020/0228762 A1 Jul. 16, 2020

(30) Foreign Application Priority Data
Mar. 2, 2017 (KR) .................. 10-2017-0026977

(51) Int. Cl.
*H04N 9/04* (2006.01)
*H04N 5/232* (2006.01)
*H04N 7/18* (2006.01)

(52) U.S. Cl.
CPC ..... *H04N 9/04553* (2018.08); *H04N 5/23212* (2013.01); *H04N 7/181* (2013.01)

(58) Field of Classification Search
None
See application file for complete search history.

(56) References Cited

U.S. PATENT DOCUMENTS 8,379,134 B2 * 2/2013 Foster ................... H04N 5/232
250/330
9,071,737 B2 * 6/2015 Blayvas ................. H04N 5/217
(Continued)

FOREIGN PATENT DOCUMENTS

| JP | 2000-188713 | 7/2000 |
| KR | 10-0715140 | 5/2007 |

(Continued)

OTHER PUBLICATIONS

International Search Report for PCT/KR2017/004737 dated Nov. 24, 2017 and its English translation from WIPO (now published as WO2018/159896).

(Continued)

*Primary Examiner* — Chikaodili E Anyikire
(74) *Attorney, Agent, or Firm* — Ladas & Parry, LLP (57) ABSTRACT

The present invention relates to a monitoring camera having an autofocusing function based on a composite filtering robust against a change in visibility status and a video monitoring system employing the same. The present invention comprises: a hardware filter for blocking one of a visible light band and an infrared light band and allowing the other thereof to pass therethrough; and a software filter for filter- (Continued)

ing a color image or a black-and-white image generated by an image signal processor (ISP) by removing, from the color image or the black-and-white image, a factor reducing a visibility distance at the front side of a lens part, wherein the filtering band of the hardware filter and whether to perform filtering by the software filter are controlled according to a filtering level corresponding to a current visibility status at the front side of the lens part among a plurality of filtering levels. Therefore, the present invention can provide an image which is always clear enough to enable a target object to be identified regardless of a visibility status at the front of a monitoring camera, and an accurate autofocusing function can be provided constantly regardless of the visibility status in front of the monitoring camera by performing autofocusing using analysis of an image provided through stepwise composite filtering.

8 Claims, 6 Drawing Sheets

(56) References Cited

U.S. PATENT DOCUMENTS 9,354,486 B2 * 5/2016 Bigioi .................. H04N 5/2254
2011/0298944 A1 * 12/2011 Kuo ..................... H04N 5/3572
348/223.1
2013/0057713 A1 * 3/2013 Khawand ........... H04N 5/23258
348/208.1
2019/0052791 A1 * 2/2019 Toyoda .............. H04N 5/23245
2019/0065845 A1 * 2/2019 Xu ........................ G06K 9/0061
2019/0156516 A1 * 5/2019 Nikkanen ................ G06T 7/90

FOREIGN PATENT DOCUMENTS

| KR | 10-1032160 | 5/2011 |
| KR | 10-1219659 | 1/2013 |
| KR | 10-1279374 | 7/2013 |
| KR | 10-1426298 | 8/2014 |
| KR | 10-1534646 | 7/2015 |
| KR | 10-2016-0088466 | 7/2016 |
| KR | 10-1649256 | 8/2016 |

OTHER PUBLICATIONS

Written Opinion of the International Searching Authority for PCT/KR2017/004737 dated Nov. 24, 2017 and its English machine translation by Google Translate (now published as WO2018/159896).

* cited by examiner

MONITORING CAMERA HAVING AUTOFOCUSING FUNCTION BASED ON COMPOSITE FILTERING ROBUST AGAINST CHANGE IN VISIBILITY STATUS AND VIDEO MONITORING SYSTEM EMPLOYING SAME

CROSS-REFERENCE TO RELATED APPLICATIONS

This application is the U.S. national phase of PCT Application No. PCT/KR2017/004737 filed on May 8, 2017, which claims priority to Korean Patent Application No. 10-2017-0026977, filed on Mar. 2, 2017, the entire contents of which are incorporated herein by reference.

TECHNICAL FIELD

The present invention relates to a monitoring camera that photographs a specific region and monitors the region and a video monitoring system employing the monitoring camera.

BACKGROUND ART

A monitoring camera is installed and operated in an underground parking lot of a building, a highway, an airport, a port, a border, and the like so as to prevent or record various accidents. However, a natural phenomenon such as fog, dusk, rainfall, and snowfall absorbs or scatters light, thereby, acting as a factor reducing quality of an image taken by the monitoring camera and interfering with monitoring. If the quality of the image taken by the monitoring camera, particularly clearness, is reduced, an intruder's face, a license plate, and the like cannot be identified from the image taken by the monitoring camera, and thereby, the monitoring camera cannot serve as a monitoring camera for preventing or recording various accidents. Fog, yellow dust, rainfall, snowfall, and the like serve as visibility obstructions that reduce a visibility distance that is the maximum distance that a person with a normal vision can recognize any target object in the horizontal direction, and a research for removing the visibility obstructions from the image photographed by the monitoring camera has been actively conducted.

Various algorithms for removing the most frequently occurring fog among the fog, the yellow dust, the rainfall, and the snowfall from an image have been continuously published through patents and theses. For example, Korean Patent No. 10-1426298 entitled "IMAGE CORRECTION DEVICE AND METHOD INCREASING FOG REMOVAL RATE", Korean Patent No. 10-1534646 entitled "IMAGE PROCESSING DEVICE AND METHOD FOR REMOVING FOG FROM IMAGE", and the like applied a fog removal algorithm which uses various software methods to an image provided from a digital camera. However, the technology of related art has a problem that, since a visibility status in front of the monitoring camera is not considered, and thereby, if the visibility status in front of the monitoring camera is changed, clearness of an image provided from the digital camera also is also changed, and there may be a situation in which a target object cannot be identified from the image taken by the monitoring camera according to the visibility status in front of the monitoring camera due to a limitation in improving the clearness of the software algorithm.

A difference in dearness of an image according to the visibility status in front of the monitoring camera has the greatest affection on autofocusing of the monitoring camera. The autofocusing is a function of a camera that automatically focuses on a subject and is classified into an active method of emitting ultrasound or infrared rays to measure a distance to the subject and a manual method of focusing the camera using naturally reflected light from the subject. The active method has an advantage in that a focus can be adjusted well even when an image clearness is low due to poor visibility, such as nighttime or a bad weather, but the active method has a disadvantage in that the focus cannot be adjusted well when there is an obstacle such as a window between the camera and the subject. In contrast to this, the manual method has an advantage in that the focus can be adjusted well when there is the obstacle such as the window between the camera and the subject, but the manual method has a disadvantage in that the focus cannot be adjusted because it is difficult to distinguish the subject when the image sharpness is low due to a bad visibility status.

DISCLOSURE

Technical Problem

It is to provide a monitoring camera capable of always providing an image which is clear enough to identify a target object regardless of a change in visibility status in front of the monitoring camera and always providing an accurate autofocusing function regardless of the visibility status in front of the monitoring camera. In addition, it is to provide a video monitoring system to which such a monitoring camera is applied. In addition, the present invention is not limited to the above-described technical problems, and another technical problem may be derived from the following description.

Technical Solution

According to one aspect of the present invention, there is provided a monitoring camera, which has an autofocusing function based on composite filtering robust against a change in visibility status, includes a lens unit that includes at least one lens; a hardware filter that blocks any one of an infrared light band and a visible light band of light passing through the lens unit and allows the other one to pass therethrough according to a current visibility status in front of the lens unit; an image sensor that converts the light passing through the hardware filter into an electrical signal; an ISP (Image Signal Processor) that generates a color image or a black-and-white image from a signal which is output from the image sensor according to a band of light which is emitted the hardware filter; a software filter that filters the color image or the black-and-white image which is generated by the ISP by removing a factor reducing a visibility distance in front of the lens unit from the color image or the black-and-white image which is generated by the ISP according to the current visibility status in front of the lens unit; an autofocusing unit that performs autofocusing of the lens unit using analysis of the color image which is generated by the ISP or performs the autofocusing of the lens unit using analysis of the color image or the black-and-white image which is filtered by the software filter depending on whether or not filtering of the software filter is performed; and a control unit that controls a filtering band of the hardware filter and whether or not the filtering of the software filter is performed according to any one filtering level corresponding to the current visibility status in front of the lens unit among a plurality of filtering levels from which an image that is input to the autofocusing unit is determined according to the filtering band of the hardware filter and whether or not the filtering of the software filter is performed.

The monitoring camera may further include an actuator that moves a location of at least one lens of the lens unit under a control of the autofocusing unit, and the autofocusing unit may perform autofocusing using a method of analyzing a change in clearness of a color image or a black-and-white image filtered by the software filter while an operation of the actuator is controlled so that a distance between at least one lens of the lens unit and the image sensor is changed in a case where the color image or the black-and-white image generated by the ISP is filtered by the software filter, and determining a location of at least one lens of the lens unit at a moment when clearness of the color image or the black-and-white image filtered by the software filter is highest as a focusing location of the lens unit.

The plurality of filtering levels may include a first filtering level in which a color image that is output from the ISP is directly input to the autofocusing unit in a state where an infrared light band of light passing through the lens unit is blocked by the hardware filter, a second filtering level in which the color image that is output from the ISP is filtered by the software filter and then is input to the autofocusing unit in a state where the infrared light band of the light passing through the lens unit is blocked by the hardware filter, and a third filtering level in which the black-and-white image that is output from the ISP is filtered by the software filter and then is input to the autofocusing unit in a state where a visible light band of the light passing through the lens unit is blocked by the hardware filter.

In the third filtering level, a black-and-white image that is filtered by the software filter may be input to the autofocusing unit by using a method in which a predetermined image filtering algorithm for removing a factor reducing the visibility distance is applied to the black-and-white image which is output from the ISP, and the plurality of filtering levels may further include a fourth filtering level in which an image that is filtered by the software filter is input to the autofocusing unit by using a method in which a luminance value of each pixel of the black-and-white image that is output from the ISP is inverted in a state where a visible light band of light passing through the lens unit is blocked by the hardware filter and the same image filtering algorithm as the predetermined image filtering algorithm is applied to the black-and-white image having the inverted luminance value.

The monitoring camera may further include a visibility distance measurement unit that measures a visibility distance in front of the lens unit on the basis of pixel values of the color image or the black-and-white image which is generated by the ISP, and the control unit may select any one of the filtering levels according to the visibility distance that is measured by the visibility distance measurement unit from among the first filtering level, the second filtering level, and the third filtering level and controls the filtering band of the hardware filter and whether or not the filtering of the software filter is performed.

The control unit may control the filtering band of the hardware filter such that the hardware filter temporarily blocks the infrared light band of the light passing through the lens unit and allows the visible light band thereof to pass therethrough every measurement period of the visibility distance while the hardware filter blocks the visible light band of the light passing through the lens unit and allows the infrared light band thereof to pass therethrough, and the visibility distance measurement unit may measure the visibility distance in front of the lens unit on the basis of the pixel values of the color image that is generated by the ISP in a state where the infrared light band of the light passing through the lens unit is blocked and the visible light band thereof is allowed to pass therethrough by the hardware filter every measurement period of the visibility distance.

The visibility distance measurement unit may measure the visibility distance in front of the lens unit by calculating a concentration of a factor reducing the visibility distance in front of the lens unit on the basis of the pixel values of the color image which is generated by the ISP in a state where the infrared light band of the light passing through the lens unit is blocked and the visible light band thereof is allowed to pass therethrough by the hardware filter and setting the visibility distance in front of the lens unit in inverse proportion to the calculated concentration, and the visibility distance measurement unit may measure the visibility distance in front of the lens unit by calculating the concentration of the factor reducing the visibility distance in front of the lens unit on the basis of the pixel values of the black-and-white image which is generated by the ISP in a state where the visible light band of the light passing through the lens unit is blocked and the infrared light band thereof is allowed to pass therethrough by the hardware filter, adding a weighted value to the calculated concentration, and setting the visibility distance in front of the lens unit in inverse proportion to the concentration to which the weighted value is added.

The monitoring camera may further include a compression unit that compresses the color image generated by the ISP or compresses the color image or the black-and-white image filtered by the software filter depending on whether or not the filtering of the software filter is performed. The control unit may control the filtering band of the hardware filter and whether or not the filtering of the software filter is performed according to any one filtering level corresponding to the current visibility status in front of the lens unit among the plurality of filtering levels from which the image that is input to the compression unit and the autofocusing unit is determined according to the filtering band of the hardware filter and whether or not the filtering of the software filter is performed.

According to another aspect of the present invention, there is provided a video monitoring system including at least one monitoring camera including the monitoring camera; and a server that displays a color image or a black-and-white image which is transmitted from the at least one monitoring camera through a network to the user.

Advantageous Effects

As the hardware filter blocks any one of an infrared light band and a visible light band of light passing through a lens unit and allows the other one to pass therethrough according to a current visibility status in front of a lens unit, and as a software filter removes a factor reducing a visibility distance in front of the lens unit from a color image or a black-and-white image generated by an ISP (Image Signal Processor) according to the current visibility status in front of the lens unit, a filtering band of the hardware filter and whether or not the filtering of the software filter is performed are controlled according to any one filtering level corresponding to the current visibility status in front of the lens unit among a plurality of filtering levels based on a composite filtering method for filtering the color image or the black-and-white image generated by the ISP, and thereby, it is possible to provide an image having clearness enough to always identify a target object regardless of the visibility status in front of a monitoring camera. Furthermore, by performing an autofocusing using analysis of an image clearly provided at all times based on stepwise composite filtering, it is possible to provide an accurate autofocusing function regardless of the visibility status in front of the monitoring camera, and as a result, it is possible to provide an image with high quality not affected by the visibility status in front of the visibility status of the monitoring camera.

In particular, by employing a filtering method that combines hardware optical filtering and software image filtering, a plurality of filtering levels can complement a limitation of the hardware optical filtering and a limitation of the software image filtering, and as a result, it is possible to provide an image with a much better clearness and higher accurate autofocusing than an image filtered by either the hardware optical filtering or the software image filtering, and the image can be filtered by a low-performance monitoring camera because a load of image filtering is reduced. In addition, since the filtering levels of four types in the present embodiment are applied to an original image before the image is compressed by the monitoring camera, the clearness of the image is not reduced due to an image loss in image compression and decompression process, and thus, it is possible to provide a very clear image and a highly accurate autofocusing function even in a bad weather in which a visibility distance is very short or at night.

MODE OF THE INVENTION

Hereinafter, embodiments of the present invention will be described in detail with reference to the accompanying drawings. The embodiments which will be described below relate to a monitoring camera using a composite filtering method robust against a change in visibility status and a video monitoring system to which the monitoring camera is applied so as to provide an image of a clearness enough to always identify an target object and to always provide correct autofocusing, irrespective of a front visibility status. Hereinafter, the monitoring camera using a composite filtering method robust against a change in visibility status can be simply referred to as a "monitoring camera". Hereinafter, The "visibility" refers to a degree of turbidity of the atmosphere, and a "visibility distance" refers to the maximum distance at which a person with a normal vision can recognize a certain target object in the horizontal direction, and a term "video" is used to mean a video displayed on a monitor, binary data representing the video, and the like, as commonly used in the art to which the embodiments of the present invention belong.

Figure 1:
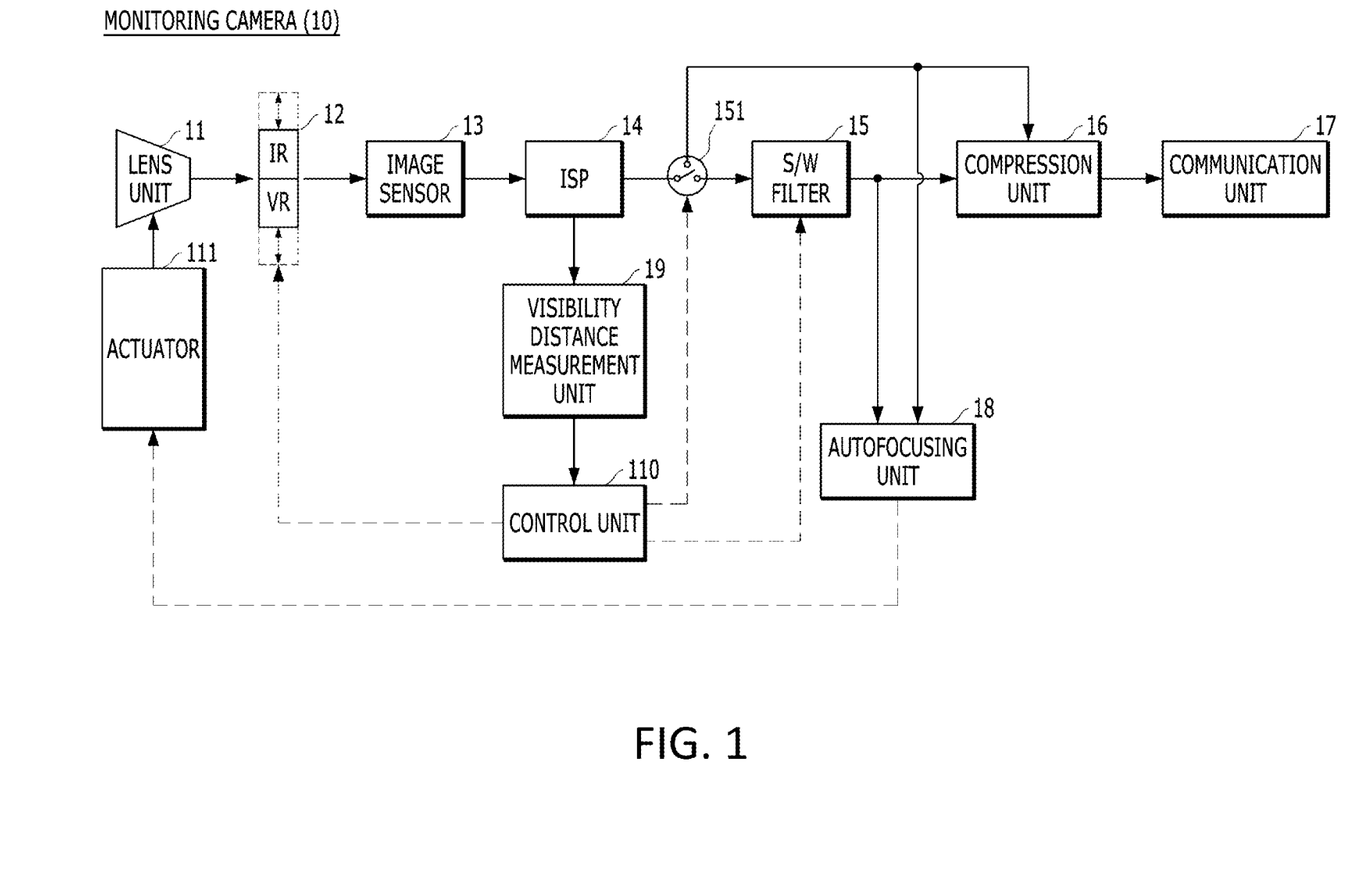
FIG. 1 is a configuration diagram of a monitoring camera 10 according to an embodiment of the present invention.

FIG. 1 is a configuration diagram of a monitoring camera 10 according to an embodiment of the present invention. Referring to FIG. 1, the monitoring camera 10 according to the present embodiment includes a lens unit 11, an actuator 111, a hardware filter 12, an image sensor 13, an ISP (image signal processor) 14, a software filter 15, a switch 151, a compression unit 16, a communication unit 17, an autofocusing unit 18, a visibility distance measurement unit 19, and a control unit 110. The monitoring camera 10 according to the present embodiment can further include a housing, a memory, and the like in addition to the above-described configuration element, but in order to prevent features of the present embodiment from being blurred, description on general configuration elements of the camera that are not relevant to the features of the present embodiment will be omitted. A part of the above-described configuration elements can be realized by a combination of a microprocessor, a memory in which a computer program is stored, and the like.

The lens unit 11 is configured by at least one lens. In general, the monitoring camera supports a zoom-in function for enlarging and photographing an target object if a moving target object is captured and a zoom-out function for widening the entire photographing region and is configured by a plurality of lenses so as to enable the zoom-in/zoom-out functions. For example, the lens unit 11 can be configured by a convex lens, a concave lens, and another convex lens which are embedded in a cylindrical lens barrel. In a case where the lens unit 11 is configured with one lens, a focus location of the lens unit 11 can be changed by moving a location of the one lens. In a case where the lens unit 11 is configured with a plurality of lenses, the focus location of the lens unit 11 can be changed by moving locations of one or more of the lenses, and such a lens is called a focus lens. Since the lens unit 11 is not related to the features of the present embodiment, further detailed description will be omitted so as to prevent the features of the present embodiment from being blurred.

The actuator 111 moves the location of at least one lens of the lens unit 11 under a control of the autofocusing unit 18. In a case where the lens unit 11 is configured by one lens or the focus lens among the plurality of lenses of the lens unit 11 is configured with one lens, the actuator 111 moves the location of the one lens under the control of the autofocusing unit 18. In a case where the focus lens of the lens unit 11 is configured with a plurality of lenses, the actuator 111 moves the locations of the plurality of lenses corresponding to the focus lens under the control of the autofocusing unit 18. The actuator 111 can be configured with a motor that provides power for moving the location of at least one lens of the lens unit 11, a unit that converts a rotational motion of the motor into a linear motion of the lens, and the like.

The hardware filter 12 blocks either an infrared light band or a visible light band of light passing through the lens unit 11 according to a current visibility status in front of the lens unit 11 and allows the other to pass therethrough. In a case where the weather is clear and the visibility is good, the hardware filter 12 blocks the infrared light band of light passing through the lens unit 11 and allows the visible light band to pass therethrough. In a case where the visibility status is poor due to a nighttime or a bad weather, the hardware filter 12 blocks the visible light band of light passing through the lens unit 11 and allows the infrared light band thereof to pass therethrough. As the infrared light band is filtered by the hardware filter 12 and the visible light band passes through, the light of the visible light band emitted from the hardware filter 12 is used to generate a color image, and as the visible light band is filtered and the infrared light band passes through, the light of the infrared light band emitted from the hardware filter 12 is used to generate a black-and-white image.

The hardware filter 12 can be realized by stacking various types of dielectrics as a type of an optical filter that allows only a specific light band to pass through and is referred to as a "dielectric filter" or a "dielectric lens". The hardware filter 12 is formed in a rectangular plate shape and is configured by an infrared light blocking region for blocking the infrared light band incident thereon and allowing the visible light band incident thereon to pass through and a visible light blocking region for blocking the visible light band incident thereon and allowing the infrared light band to pass through. The hardware filter 12 is moved under a control of the control unit 110 and any one of the infrared light blocking region and the visible light blocking region is located behind the lens unit 11. The hardware filter 12 can be formed in a shape in which two discs similar to a shape of the lens are bonded in addition to the rectangular plate shape, or a variety of shapes.

If the infrared light blocking region of the hardware filter 12 is located behind the lens unit 11, the hardware filter 12 blocks the infrared light band of light passing through the lens unit 11 and allows the visible light band thereof to pass therethrough. If the visible light blocking region of the hardware filter 12 is located behind the lens unit 11, the hardware filter 12 blocks the visible light band of light passing through the lens unit 11 and allows the infrared light band thereof to pass therethrough. Since a drive system for movement of the hardware filter 12 can be realized by a very simple structure, the structure, which is obtained at a very low cost and hardly causes performance deterioration due to a secular change, can selectively allow only one of the infrared light band and the visible light band of light that passes through the lens unit 11.

The image sensor 13 converts the light passing through the hardware filter 12 into an electrical signal. The image sensor 13 can be divided into a CCD (Charge Coupled Device) sensor and a CMOS (Complementary Metal-Oxide Semiconductor) sensor. The image sensor 13 responds to both infrared light and visible light and converts the light into an electrical signal. In a case where a color image is generated from a signal output from the image sensor 13, the infrared light irradiated to the image sensor acts as a factor reducing an image quality of the color image, and in a case where a black-and-white image is generated from the signal output from the image sensor 13, the visible light irradiated to the image sensor 13 act as a factor reducing the image quality of the black-and-white image. For this reason, as described above, the hardware filter 12 blocks any one of the infrared light band and the visible light band of light that passes through the lens unit 11 and allows the other to pass therethrough according to a visibility status in front of the lens unit 11.

The ISP 14 generates a color image or a black-and-white image according to a band of light emitted from the hardware filter 12 from a signal output from the image sensor 13. In a case where light of a visible light band is emitted from the hardware filter 12 as the infrared light band is filtered and the visible light band is allowed to pass through by the hardware filter 12, the ISP 14 generates the color image from the signal output from the image sensor 13, and in a case where light of the infrared light band is emitted from the hardware filter 12 as the visible light band is filtered and the infrared light band is allowed to pass through by the hardware filter 12, the ISP 14 generates the black-and-white image from the signal output from the image sensor 13. The ISP 14 basically interpolates a value of each pixel of a Bayer pattern image of the signal output from the image sensor 13 to generate the color image or the black-and-white image of LVDS (Low Voltage Differential Signaling) format. The ISP 14 can further perform image enhancement processing such as removing noise of the color image or the black-and-white image generated as described above, correcting backlight, and adjusting a color close to a natural color.

The software filter 15 removes a factor reducing a visibility distance in front of the lens unit 11 from the color image or the black-and-white image generated by the ISP 14 according to a current visibility status in front of the lens unit 11, thereby, filtering the color image or the black-and-white image generated by the ISP 14. A representative factor reducing the visibility distance in front of the lens unit 11 can include fog, yellow dust, rainfall, snowfall, and nighttime. Fog particles scattered in the air cause scattering of light to distort the image. Hereinafter, the factor reducing the visibility distance can be referred to simply as a "visibility obstruction factor". More specifically, the software filter 15 filters the color image or the black-and-white image generated by the ISP 14 by applying a predetermined image filtering algorithm for removing the factor reducing the visibility distance in front of the lens unit 11 to the color image or the black-and-white image generated by the ISP 14 according to a current visibility status in front of the lens unit 11.

An example of the predetermined image filtering algorithm for removing the factor reducing the visibility distance in front of the lens unit 11 can include a DCP (Dark Channel Priority) algorithm. The DCP algorithm estimates a concentration of the fog using a statistical characteristic that a minimum value of all channels of RGB (Red, Green, and Blue) is "0" in a normal region without fog and removes the fog from the image according to the concentration of the fog estimated as described above. That is, the software filter 15 can filter the color image or the black-and-white image by applying the DCP algorithm to the color image or black-and-white image generated by the ISP 14 according to the current visibility status in front of the lens unit 11.

In order to further improve the image enhancement effect, another image filtering algorithm other than the DCP algorithm, for example, a histogram equalization algorithm can be additionally applied to further improve a clearness of the image. The histogram equalization algorithm is an algorithm for equalizing a histogram that illustrates a frequency of brightness values of pixels of the image in a form of a bar graph, and by maximizing a contrast of light and darkness by redistributing a brightness distribution of the image, the clearness of the image can be improved. That is, the software filter 15 can filter the color image or the black-and-white image generated by the ISP 14 by applying the DCP algorithm and the histogram equalization algorithm to the color image or the black-and-white image generated by the ISP 14 according to the current visibility status in front of the lens unit 11. Since the DCP algorithm and the histogram equalization algorithm are well known to those skilled in the art, a detailed description thereof will be omitted in order to prevent the features of the present embodiment from being blurred.

Technologies of related art, such as Korean Patent No. 10-1426298 entitled "IMAGE CORRECTION DEVICE AND METHOD FOR INCREASING FOG REMOVAL RATE" and Korean Patent No. 10-1534646 entitled "IMAGE PROCESSING DEVICE AND METHOD FOR REMOVING FOG FROM IMAGE" applied various fog removal algorithms to the image provided by a digital camera. In general, the digital camera such as the monitoring camera 10 compresses an image and transmits the compressed image to a device having an image display function such as a PC (Personal Computer). The device recovers image data compressed by the digital camera, which causes image loss. As a result, there was a limitation to image enhancement even if a good fog removal algorithm was applied, and in order to obtain a certain image quality from a lossy image, a high-capacity algorithm that causes a very large load on a processor and a memory is required. The high-capacity algorithms cannot be smoothly executed by the digital camera with a very low performance compared to the PC.

In the present embodiment, the software filter 15 has a very excellent image enhancement effect even if the image filtering algorithm has a small-capacity file, by applying an image filtering algorithm such as the DCP algorithm and the histogram equalization algorithm to a lossless image of the LVDS format generated by the ISP 14 before the image data is compressed. A microprocessor that performs a function of the ISP 14 can also perform a function of the software filter 15, but the software filter 15 is preferably realized as a separate DSP (Digital Signal Processor) due to a performance limitation of the microprocessor. As will be described below, the software filter 15 always applies the same image filtering algorithm to the lossless image of the LVDS format generated by the ISP 14 according to any one filtering level selected according to the current visibility status in front of the lens unit 11 among a plurality of filtering levels. Accordingly, the software filter 15 can be realized by a DSP with a relatively low performance.

The compression unit 16 compresses the color image generated by the ISP 14 or compresses the color image or the black-and-white image filtered by the software filter 15 depending on whether or not the filtering of the software filter 15 is performed for the color image or the black-and-white image generated by the ISP 14. In a case where the color image generated by the ISP 14 is directly input to the compression unit 16 without being filtered by the software filter 15, the compression unit 16 compresses the color image generated by the ISP 14. In a case where the color image or the black-and-white image generated by the ISP 14 is filtered by the software filter 15, the compression unit 16 compresses the color image or the black-and-white image filtered by the software filter 15. The compression unit 16 can compress the color image or the black-and-white image according to various codecs such as H.264 and an HEVC (High Efficiency Video Codec).

The communication unit 17 transmits the image compressed by the compression unit 16 to a user, for example, a device that displays an image captured by the monitoring camera 10 such as a computer in a control center. In a case where the video display device is far apart from the monitoring camera 10, the video display device communicates with the monitoring camera 10 through a network such as the Internet or LAN. The communication unit 17 can transmit the image compressed by the compression unit 16 to the video display device through the network according to TCP/IP (Transmission Control Protocol/Internet Protocol).

The autofocusing unit 18 performs autofocusing of the lens unit 11 using analysis of a color image generated by the ISP 14, or performs the autofocusing of the lens unit 11 using analysis of the color image or the black-and-white image filtered by the software filter 15, depending on whether or not the software filter 15 filters the color image or a black-and-white image generated by the ISP 14. In a case where the color image generated by the ISP 14 is directly input to the autofocusing unit 18 without being filtered by the software filter 15, the autofocusing unit 18 performs the autofocusing using a method of analyzing a change in clearness of the color image generated by the ISP 14 while an operation of the actuator 111 is controlled such that a distance between at least one lens of the lens unit 11 and the image sensor 13 is changed, and determining a location of at least one lens of the lens unit 11 at the moment when clearness of the color image generated by the ISP 14 is highest as a focusing location of the lens unit 11.

For example, the autofocusing unit 18 performs the autofocusing using a method of receiving the color image generated by the ISP 14 every time at least one lens of the lens unit 11 moves by a unit distance while the operation of the actuator 111 is controlled such that the distance between at least one lens of the lens unit 11 and the image sensor 13 is changed, performing a discrete wavelet transform for the received color image, and determining the location of at least one lens of the lens unit 11 at the moment when a magnitude of a high-frequency component among a low-frequency component and the high-frequency component of a resultant value of the discrete wavelet transform becomes maximum as the focusing location of the lens unit 11. Since the larger the magnitude of the high-frequency component of the resultant value of the discrete wavelet transform is, the higher the image clearness is, the location of at least one lens of the lens unit 11 at the moment when the magnitude of the high-frequency component of the resultant value of the discrete wavelet transform becomes maximum, is a location where the lens unit 11 is most accurately focused.

In a case where the color image or the black-and-white image generated by the ISP 14 is filtered by the software filter 15, the autofocusing unit 18 performs the autofocusing using a method of analyzing a change in clearness of the color image or the black-and-white image filtered by the software filter (15) while the operation of the actuator 111 is controlled such that the distance between the at least one lens of the lens unit 11 and the image sensor 13 is changed, and determining the location of at least one lens of the lens unit 11 at the moment when the clearness of the color image or the black-and-white image filtered by the software filter 15 is highest as the focusing location of the lens unit 11.

For example, the autofocusing unit 18 performs the autofocusing using a method of receiving the color image or the black-and-white image filtered by the software filter 15 every time at least one lens of the lens unit 11 moves by a unit distance while the operation of the actuator 111 is controlled such that the distance between at least one lens of the lens unit 11 and the image sensor 13 is changed, performing the discrete wavelet transform for the received color image or the black-and-white image, and determining the location of the at least one lens of the lens unit 11 at the moment when the magnitude of the high-frequency component among the low-frequency component and the high-frequency component of the resultant value of the discrete wavelet transform becomes maximum as the focusing location of the lens unit 11. In addition to the above-described method, the autofocusing unit 18 may perform the autofocusing using various methods such as a contrast detection method and a phase difference detection method which are kinds of a manual method.

The visibility distance measurement unit 19 measures a visibility distance in front of the lens unit 11 on the basis of pixel values of the color image or the black-and-white image generated by the ISP 14. It is also possible to measure the visibility distance in front of the lens unit 11 by using a device for automatically calculating the visibility distance by analyzing an atmospheric component, but the device is very expensive. For this reason, in general, monitoring cameras distributed in various places are grouped by region, and one device is installed in each region. As a result, there is a problem that the visibility distance cannot be accurately measured for each monitoring camera. In order to solve the problem, technologies for measuring the visibility distance by using software based on an output image of the monitoring camera have appeared. Examples of the technology of related art can include Korea Patent No. 10-0715140 entitled "VISIBILITY MEASUREMENT DEVICE AND METHOD", Korea Patent No. 10-1032160 entitled "SYSTEM FOR MEASURING ROAD VISIBILITY USING CAMERA AND METHOD THEREOF", and the like.

The technology of related art measures visibility on the basis of an image provided from a digital camera. Generally, since a digital camera such as the monitoring camera 10 compresses and transmits the image, image loss happens during a process in which image data compressed by the digital camera is recovered. As a result, even if an excellent visibility distance measurement algorithm is applied, accuracy of the visibility distance calculated from the lost image is limited. In the present embodiment, since the visibility distance measurement unit 19 measures the visibility distance in front of the lens unit 11 on the basis of pixel values of a lossless image of the LVDS format generated by the ISP 14 before the image data is compressed, the visibility distance in front of the lens unit 11 can be measured more accurately than in the technology of related art, under the premise that the same algorithm as in the technology of related art is used. It is preferable that the visibility distance measurement unit 19 is realized as a separate DSP like the software filter 15.

Figure 2:
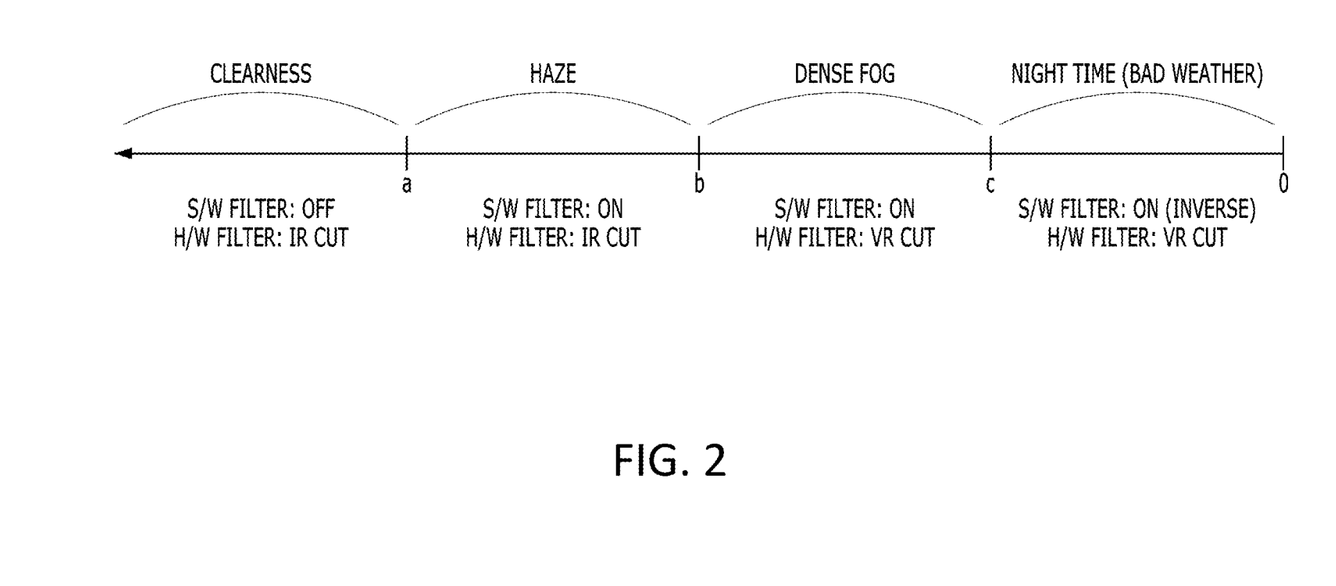
FIG. 2 is a diagram illustrating a stepwise filtering method of the monitoring camera 10 illustrated in FIG. 1.

FIG. 2 is a diagram illustrating a stepwise filtering method of the monitoring camera 10 illustrated in FIG. 1. Referring to FIG. 2, the visibility status in front of the lens unit 11 is divided into a clearness status, a haze status, a dense fog status, and a night status. The monitoring camera 10 according to the present embodiment filters an image step by step with filtering levels of four types corresponding to visibility statuses of four types divided as described above according to a current visibility status in front of the lens unit 11, and thereby, even if the visibility status in front of the lens unit 11 is changed, it is possible to always provide an image with clearness enough to identify a target object. In particular, the filtering levels of four types in the present embodiment employs a filtering method in which a hardware light filtering and software image filtering are combined, thereby, limitation of the hardware light filtering and the limitation of the software image filtering can be complemented, and as a result, it is possible to provide an image with a much better clearness than a image filtered by any one method of the hardware light filtering and the software image filtering.

As described above, the present embodiment performs autofocusing of he lens unit 11 using analysis of the color image generated by the ISP 14 or performs the autofocusing of the lens unit 11 using analysis of the color image or the black-and-white image filtered by the software filter 15, depending on whether or not the software filter 15 filters the color image or the black-and-white image generated by the ISP 14. As described above, the present embodiment performs autofocusing using analysis of the color image or the black-and-white image clearly provided all the time regardless of visibility status in front of a monitoring camera, based on a stepwise composite filtering method descried above. The higher the clearness in image, the easier distinction of the subject, and thereby, accuracy of the autofocusing increases. Accordingly, the present embodiment can provide an accurate auto focusing function all the time regardless of the visibility status in front of the monitoring camera. As accuracy of the autofocusing increases, image quality of an image increases, and as a result, it is possible to provide an image with high-quality that is not affected by the visibility status in front of the monitoring camera.

In addition, since the present embodiment performs autofocusing using a kind of manual method using analysis of a color image or a black-and-white image clearly provided all the time regardless of a visibility status in front of the monitoring camera based on a composite filtering method as described above, that is, since the autofocusing is performed by a kind of manual method of analyzing a change in clearness of a color image or a black-and-white image which is clearly provided all the time, and determining a location of at least one lens of the lens unit 11 at the moment when the clearness of the color image or the black-and-white image is highest as a focusing location of the lens unit 11, there is no disadvantage of an active method for emitting ultrasonic waves or infrared rays to measure a distance to a subject. Therefore, the present embodiment can correctly focus the monitoring camera not only even in a case a visibility status in front of the monitoring camera is poor, but also even in a case where there is an obstacle such as a window between the camera and the subject.

Most of the technologies of related art including the above-described patent documents have a very complex algorithm so as to enhance an effect of removing a visibility obstruction factor in the image, thereby, having a limitation of being not applied to a device with a low performance of a processor such as the monitoring camera 10. The present embodiment employs a composite filtering method of the filtering levels of four types corresponding to an optimal combination of the hardware light filtering and the software image filtering that can maximize a removal effect of the visibility obstruction factor while minimizing an image filtering load step by step according to the visibility status of the monitoring camera 10, thereby, a load of image filtering can be reduced and the image can be filtered by a low-performance monitoring camera. For example, in a case where a concentration of the visibility obstruction factor such as fog is high, a load of the image filtering increases, and at this time, the load of the image filtering decreases as a black-and-white image is generated.

In addition, since the filtering levels of four types in the present embodiment is applied to an original image on the monitoring camera 10 before the image is compressed, clearness of the image is not reduced due to the image loss in the image compression and decompression process, and thus, it is possible to provide an image with excellent clearness even in a bad weather condition or a nighttime condition in which the visibility distance is very short. In addition, since accuracy of autofocusing can be improved insomuch clearness of an image is improved in the bad weather condition or at the nighttime condition in which the visibility distance is very short, it is possible to provide a highly accurate autofocusing function even in a bad weather condition or at nighttime condition.

The control unit 110 controls filtering band of the hardware filter 12 and whether or not the filtering of the software filter 15 is performed, according to any one filtering level corresponding to the current visibility status in front of the lens unit 11 among a plurality of filtering levels for determining an image input to the compression unit 16 and the autofocusing unit 18 differently from each other according to a filtering band of the hardware filter 12 and whether or not the filtering of the software filter 15 is performed. As described above, the plurality of filtering levels are divided into a first filtering level, a second filtering level, a third filtering level, and a fourth filtering level corresponding to the visibility statuses of four types, and at least one of the filtering band of the hardware filter 12 and the filtering of the software filter 15 is differently selected for each filtering level such that an image with a clearness sufficient enough to always identify an target object is provided without being greatly affected by a change of the visibility status in front of the lens unit 11. That is, the control unit 110 selects any one filtering level according to the visibility distance measured by the visibility distance measurement unit 19 among the first filtering level, the second filtering level, the third filtering level, and the fourth filtering level and controls the filtering band of the hardware filter 12 and whether or not the filtering of the software filter 15 is performed, according to the selected filtering level.

More specifically, the control unit 110 controls movement of the hardware unit 12 such that any one of an infrared light blocking region and a visible light blocking region of the hardware filter 12 is located behind the lens unit 11 according to the visibility distance measured by the visibility distance measurement unit 19, thereby, controlling the filtering band of the hardware filter 12. In addition, the control unit 110 controls switching of the switch 151 such that an image output terminal of the ISP 14 is connected to either an image input terminal of the compression unit 16 and a video input terminal of the autofocus unit 18, or an image input terminal of the software filter 15 according to the visibility distance measured by the visibility distance measurement unit 19 is controlled, and thereby, controlling whether or not the filtering of the software filter 15 is performed. The image output terminal of the ISP 14 is connected to a contact point to which a signal is input among three contact points of the switch 151, and one of the two contact points from which signals are output is connected to the image input terminal of the compression unit 16 and the image input terminal of the autofocusing unit 18, and the other contact point is connected to the image input terminal of the software filter 15. The switch 151 can be realized by a combination of switching transistors and can be embedded in the software filter 15 or installed between the ISP 14 and the software filter 15.

Figure 3:
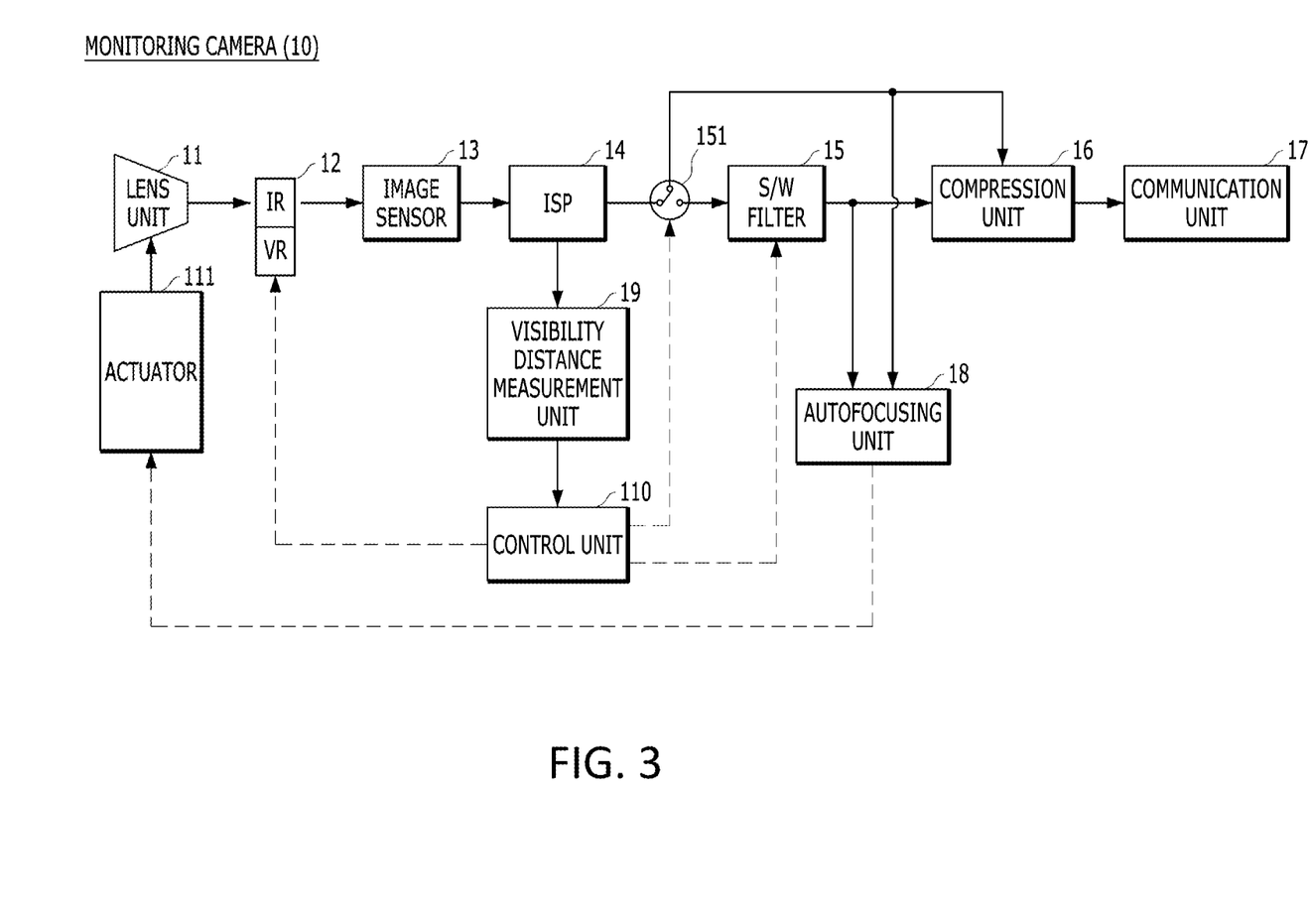
FIG. 3 is a diagram illustrating a filtering state of a first filtering level of the monitoring camera 10 illustrated in FIG. 1.

FIG. 3 is a diagram illustrating a filtering state of the first filtering level of the monitoring camera 10 illustrated in FIG. 1. In the present embodiment, the "clearness status" means a state in which an target object such as an intruder can be easily identified from an image captured by the monitoring camera 10 as the weather is clear and there is almost no image distortion caused by fog, yellow dust, rainfall, snowfall or the like and a state in which the visibility distance in front of the lens unit 11 is "a" meter or more. For example, the "clearness status" can be a state in which the visibility distance in front of the lens unit 11 is 1000 m or more. In the "clearness status", the hardware light filtering and the software image filtering are performed according to the first filtering level among the plurality of filtering levels. In the "clearness status", an image with clearness enough to identify the target object without any filtering process can be generated from light of the visible light band of light passing through the lens unit 11. In addition, since the image output from the ISP 14 has few visibility obstruction factors such as fog, in a case where the image output from the ISP 14 is filtered by the software filter 15, the image can be distorted.

In the present embodiment, the first filtering level refers to a filtering method in which a color image output from the ISP 14 is directly input to the compression unit 16 and the autofocusing unit 18 in a state where the infrared light band of light passing through the lens unit 11 is blocked and the visible light band thereof is allowed to pass therethrough by the hardware filter 12 such that a clear image can be generated from the light passing through the lens unit 11 by the monitoring camera 10. That is, if the visibility distance measured by the visibility distance measurement unit 19 belongs to a section greater than or equal to "a" meter corresponding to the "clearness status", the control unit 110 selects the first filtering level applied to the "clearness status" among the plurality of filtering levels, controls movement of the hardware filter 12 such that the infrared light blocking region of the hardware filter 12 is located behind the lens unit 11 according to the first filtering level, and controls switching of the switch 151 such that the image output terminal of the ISP 14 is connected to the image input terminal of the compression unit 16 and the image input terminal of the autofocusing unit 18. Accordingly, the hardware filter 12 blocks the infrared light band of light passing through the lens unit 11 and allows the visible light band thereof to pass therethrough in the first filtering level, and the software filter 15 outputs the color image output from the ISP 14 to the compression unit 16 and the autofocusing unit 18 as it is without filtering the color image output from the ISP 14.

Figure 4:
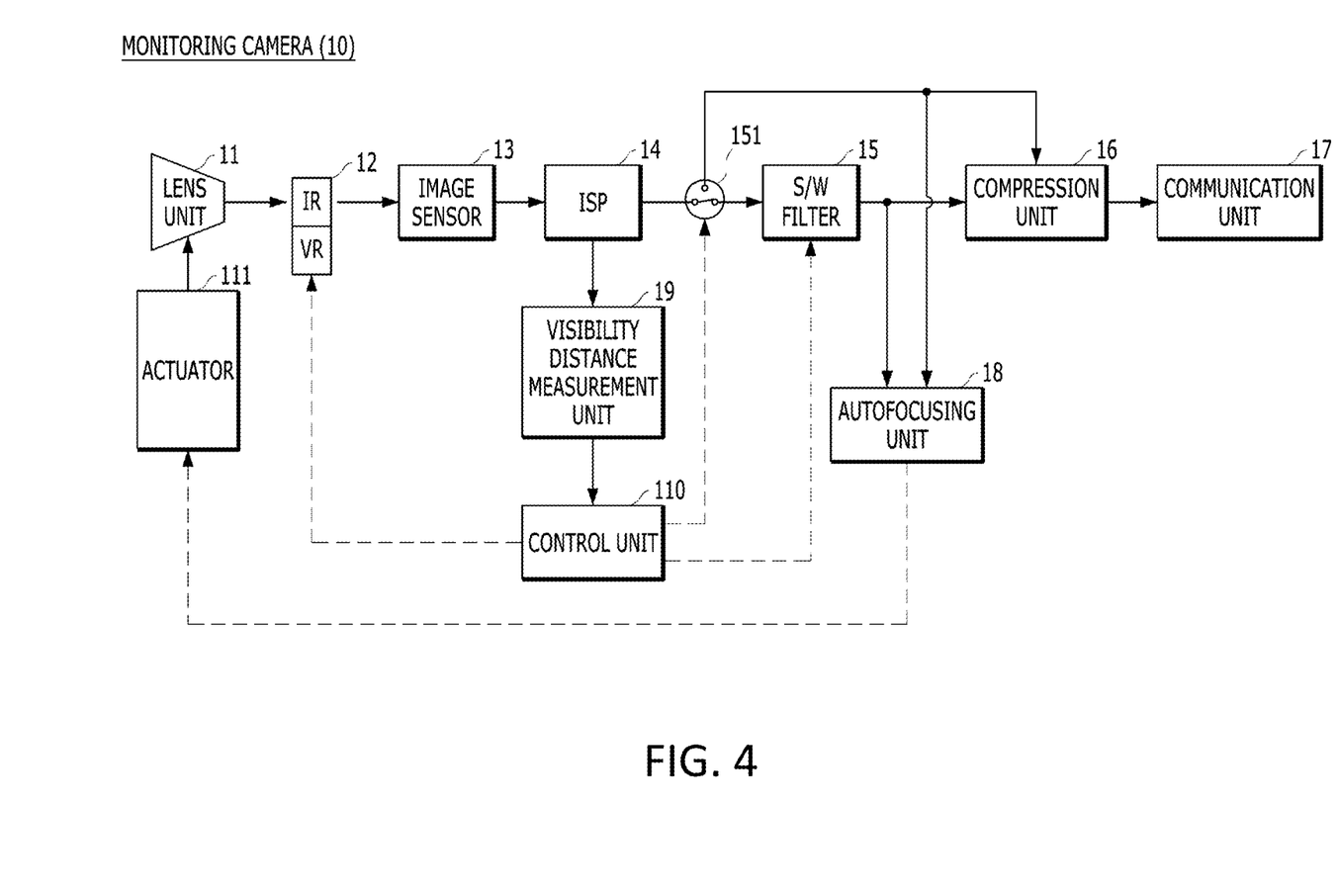
FIG. 4 is a diagram illustrating a filtering state of a second filtering level of the monitoring camera 10 illustrated in FIG. 1.

FIG. 4 is a diagram illustrating a filtering state of the second filtering level of the monitoring camera 10 illustrated in FIG. 1. In the present embodiment, the "haze status" means a state in which the visibility distance is reduced due to a thin fog formed in front of the lens portion 11, a state in which the visibility distance is reduced due to yellow dust, rainfall, snowfall or the like in addition to the fog as if the thin fog is formed, and a state in which the visibility distance in front of the lens unit 11 is less than "a" meter and is greater than or equal to "b" meter. For example, the "haze status" can be a state in which the visibility distance in front of the lens portion 11 is less than 1000 meters and greater than or equal to 300 meters. In the "haze status", the hardware light filtering and the software image filtering are performed according to the second filtering level of the plurality of filtering levels. In the "haze status", in a case where an image is generated from light of the visible light band of light passing through the lens unit 11 without any filtering process, an image including a visibility obstruction factor of a low concentration such as a thin fog is generated. In this case, if an image filtering algorithm such as the DCP algorithm is applied to the color image generated from the light of the visible light band emitted from the lens unit 11, an image with clearness enough to identify an target object can be generated.

The second filtering level in the present embodiment refers to a filtering method in which a color image output from the ISP 14 is input to the compression unit 16 and the autofocusing unit 18 after being filtered by the software filter 15 in a state where the infrared light band of light passing through the lens unit 11 is blocked and the visible light band thereof is allowed to pass therethrough by the hardware filter 12 such that a clear image can be generated from the light passing through the lens unit 11 by the monitoring camera 10. That is, if the visibility distance measured by the visibility distance measurement unit 19 belongs to a section less than "a" meter and greater than or equal to "b" meter corresponding to the "haze status", the control unit 110 selects the second filtering level applied to the "haze status" among the plurality of filtering levels, controls movement of the hardware filter 12 such that the infrared light blocking region of the hardware filter 12 is located behind the lens unit 11 according to the second filtering level, and controls switching of the switch 151 such that the image output terminal of the ISP 14 is connected to the image input terminal of the software filter 15. Accordingly, the hardware filter 12 blocks the infrared light band of light passing through the lens unit 11 and allows the visible light band thereof to pass therethrough in the second filtering level, and the software filter 15 filters the color image output from the ISP 14 and outputs the filtered color image to the compression unit 16 and the autofocusing unit 18.

Figure 5:
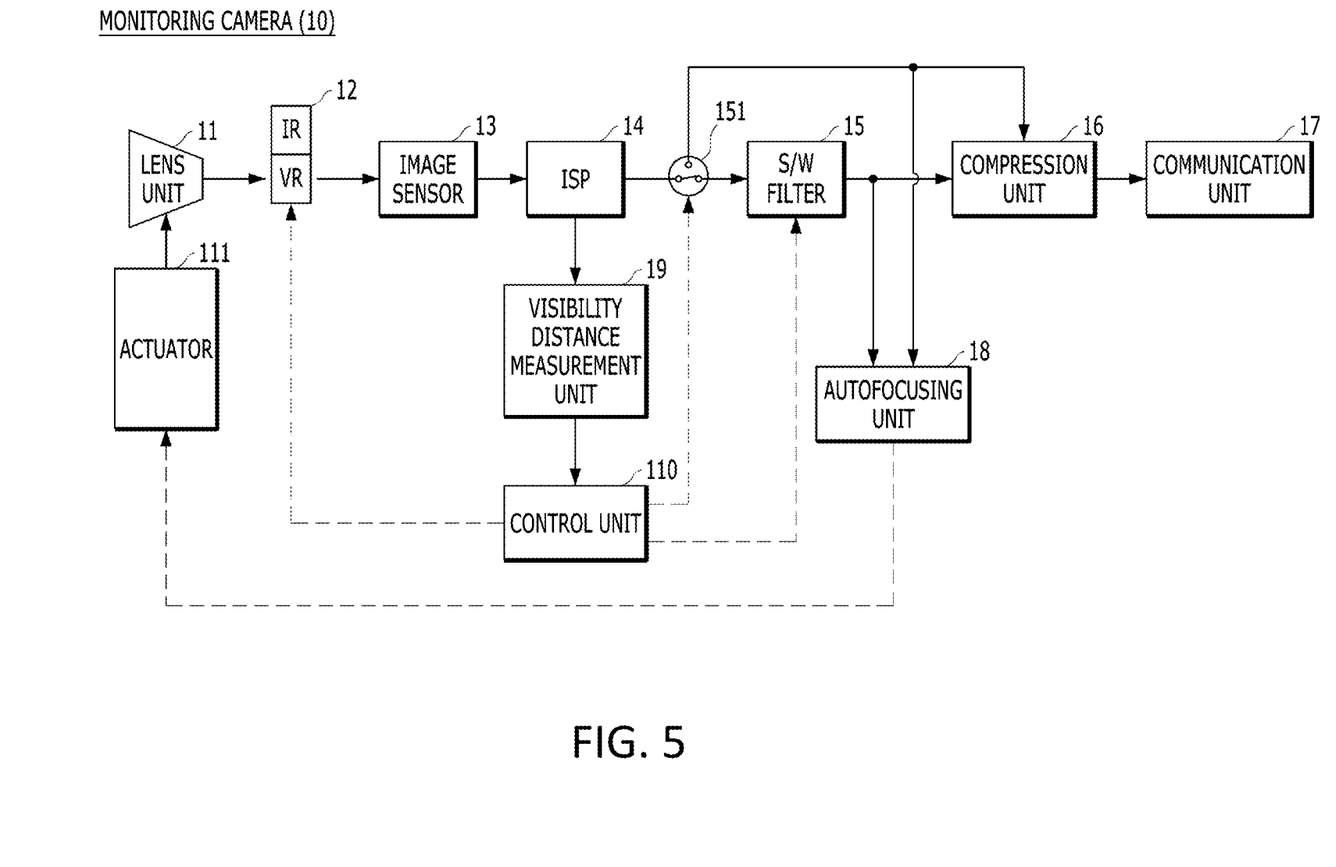
FIG. 5 is a diagram illustrating filtering states of a third filtering level and a fourth filtering level of the monitoring camera 10 illustrated in FIG. 1.

FIG. 5 is a diagram illustrating a filtering state of the third filtering level and the fourth filtering level of the monitoring camera 10 illustrated in FIG. 1. In the present embodiment, the "dense fog status" means a state in which the visibility distance is reduced due to a thick fog formed in front of the lens portion 11, a state in which the visibility distance is reduced due to yellow dust, rainfall, snowfall or the like in addition to the fog as if the thick fog is formed, and a state in which the visibility distance in front of the lens unit 11 is less than "b" meter and is greater than or equal to "c" meter. For example, the "dense fog status" can be a state in which the visibility distance in front of the lens portion 11 is less than 300 meters and greater than or equal to 10 meters. In the "dense fog status", the hardware light filtering and the software image filtering are performed according to the third filtering level of the plurality of filtering levels. In the "dense fog status", in a case where an image is generated from light of the visible light band of light passing through the lens unit 11 without any filtering process, an image including a visibility obstruction factor of a high concentration such as a thick fog is generated. If the concentration of the visibility obstruction factor is high, even if the color image output from the ISP 14 is filtered by the software filter 15, an image with clearness enough to identify an target object cannot be generated due to a large image distortion caused by the visibility obstruction factor.

In the present embodiment, the "nighttime status" means a state in which the visibility distance is reduced due to darkness in front of the lens portion 11 as the sun goes down at night, a state in which the visibility distance is reduced to the extent that sunlight disappears during daytime due to a bad weather, and a state in which the visibility distance in front of the lens unit 11 is less than "c" meter. For example, the "nighttime status" can be a state in which the visibility distance in front of the lens portion 11 is less than 10 meters. In the "nighttime status", the hardware light filtering and the software image filtering are performed according to the fourth filtering level of the plurality of filtering levels. In the "nighttime status", in a case where an image is generated from light of the visible light band of light passing through the lens unit 11 without any filtering process, a dark image that cannot be distinguished between objects in the image is generated. In a case where the dark image, even if the color image output from the ISP 14 is filtered by the software filter 15, an image with clearness enough to identify an target object cannot be generated because an edge of any object in the image is not clear.

Since an target object emits infrared light of various wavelengths according to a temperature thereof and the infrared light are not scattered well due to a visibility obstruction factor such as fog compared with visible light, the infrared light emitted from an object is mostly allowed to pass through the visibility obstruction factor such as the fog and reaches the lens unit 11. For this reason, in the "dense fog status" and the "nighttime status", an image quality of the black-and-white image generated from light of the infrared light band emitted from the lens unit 11 is better than an image quality of the color image generated from light of the visible light band emitted from the lens unit 11. Moreover, in a case where an image filtering algorithm such as the DCP algorithm is applied to the black-and-white image generated from the light in of the infrared light band emitted from the lens unit 11, the image quality can be further improved. Accordingly, in the present embodiment, the third filtering level and the fourth filtering level basically refer to a filtering method in which the black-and-white image output from the ISP 14 is filtered by the software filter 15 and then is input to the compression unit 16 and the autofocusing unit 18 in a state where the visible light band of light passing through the lens unit 11 is blocked and the infrared light band is allowed to pass therethrough by the hardware filter 12.

In the "dense fog", if an image filtering algorithm such as the DCP algorithm is applied to the black-and-white image output from the ISP 14, an image with clearness enough to identify an target object can be generated, but even if the image filtering algorithm is applied to the black-and-white image output from the ISP 14 in the "nighttime status", the black-and-white image itself is too dark, and thus, an image with clearness enough to identify the target object may not be generated. Accordingly, in the present embodiment, in order to increase brightness of the black-and-white image output from the ISP 14 in the "nighttime status", a luminance value of each pixel of the black-and-white image output from the ISP 14 is inverted. The software filter 15 subtracts the luminance value of each pixel of the black-and-white image output from the ISP 14 from a maximum luminance value and sets the subtraction result as the luminance value of each pixel of the black-and-white image output from the ISP 14, thereby, inverting the luminance value of each pixel of the black-and-white image output from the ISP 14. In a case where the entire range of the luminance values of the respective pixels is expressed as levels of 0 to 255, the maximum luminance value can be 255.

The third filtering level in the present embodiment refers to a filtering method in which an image filtering algorithm such as the DCP algorithm is applied to the black-and-white image output from the ISP 14 in a state where a visible light band of light passing through the lens unit 11 is blocked and an infrared light band thereof is allowed to pass therethrough by the hardware filter 12 such that a clear image can be generated from light passing through the lens unit 11 by the monitoring camera 10 in the "dense fog status" and in which the black-and-white image filtered by the software filter 15 is input to the compression unit 16 and the autofocusing unit 18. That is, if the visibility distance measured by the visibility distance measurement unit 19 belongs to a section less than "b" meter and greater than or equal to "c" meter corresponding to the "dense fog status", the control unit 110 selects the third filtering level applied to the "dense fog status" among the plurality of filtering levels, controls movement of the hardware filter 12 such that the visible light blocking region of the hardware filter 12 is located behind the lens unit 11 according to the third filtering level, controls switching of the switch 151 such that the image output terminal of the ISP 14 is connected to the image input terminal of the software filter 15, and controls an operation of the software filter 15 such that the image filtering algorithm is applied in a state where the black-and-white image output from the ISP 14 is not inverted.

The fourth filtering level in the present embodiment refers to a filtering method in which an image filtering algorithm such as the DCP algorithm is applied to the black-and-white image having an inverted luminance value of each pixel of the black-and-white image output from the 1SP 14 in a state where a visible light band of light passing through the lens unit 11 is blocked and an infrared light band thereof is allowed to pass therethrough by the hardware filter 12 such that a clear image can be generated from light passing through the lens unit 11 by the monitoring camera 10 in the "dense fog status" and in which the black-and-white image filtered by the software filter 15 is input to the compression unit 16 and the autofocusing unit 18. After the application of the image filtering algorithm for all pixels of the image is completed, the luminance value of each pixel of the black-and-white image can be inverted again and input to the compression unit 16 and the autofocusing unit 18. That is, if the visibility distance measured by the visibility distance measurement unit 19 belongs to a section less than "c" meter corresponding to the "nighttime status", the control unit 110 selects the fourth filtering level applied to the "nighttime status" among the plurality of filtering levels, controls movement of the hardware filter 12 such that the visible light blocking region of the hardware filter 12 is located behind the lens unit 11 according to the fourth filtering level, controls switching of the switch 151 such that the image output terminal of the ISP 14 is connected to the image input terminal of the software filter 15, and controls an operation of the software filter 15 such that the image filtering algorithm is applied in a state where the black-and-white image output from the ISP 14 is inverted.

Under the control of the control unit 110 described above, in the third filtering level, the hardware filter 12 blocks the visible light band of light passing through the lens unit 11 and allows the infrared light band thereof to pass therethrough, and the software filter 15 filters the black-and-white image output from the ISP 14 by using a method in which an image filtering algorithm is applied to the black-and-white image output from the ISP 14 and outputs the filtered image to the compression unit 16 and the autofocusing unit 18. In the fourth filtering level, the hardware filter 12 blocks the visible light band of light passing through the lens unit 11 and allows the infrared light band thereof to pass therethrough, and the software filter 15 inverts a luminance value of each pixel of the black-and-white image output from the ISP 14, filters the black-and-white image output from the ISP 14 by using a method in which an image filtering algorithm is applied to the black-and-white image having the inverted luminance value, and outputs the filtered image to the compression unit 16 and the autofocusing unit 18. As described above, since the software filter 15 does not use different image filtering algorithms for each filtering level and always uses the same image filtering algorithm in the second, third, and fourth filtering levels, the monitoring camera 10 having a lower performance than a general computer can smoothly perform the image filtering.

As described above, in the first and second filtering levels, a color image is generated by the ISP 14 as the infrared light band is filtered and a visible light band is allowed to pass through by the hardware filter 12. At the third and fourth filtering levels, black-and-white image is generated by the ISP 14 as the visible light band is filtered and the infrared light band is allowed to pass therethrough by the hardware filter. Since quality, particularly clearness of an image is greatly improved in a process of converting a color image into a black-and-white image, if a visibility distance is measured based on pixel values of the black-and-white image output from the ISP 14, there is a problem that the visibility distance is greatly increased compared with a case where the visibility distance is measured based on pixel values of a color image even though the visibility status in front of the lens unit 11 is the same. The problem can be solved by two methods such as a hardware method and a software method as follows.

First, the hardware method is as follows. The control unit 110 can control a filtering band of the hardware filter 12 such that the hardware filter 12 temporarily blocks the infrared light band of light passing through the lens unit 11 and allows the visible light band thereof to pass therethrough at each measurement period of the visibility distance of the visibility distance measurement unit 19 while the hardware filter 12 blocks the visible light band of light passing through the lens unit 11 and allows the infrared light band thereof to pass therethrough. More specifically, the control unit 110 controls movement of the hardware filter 12 such that an infrared light blocking region of the hardware filter 12 is located behind the lens unit 11 every measurement period (for example, 10 sec) of the visibility distance of the visibility distance measurement unit 19 while the visible light blocking region of the hardware filter 12 is located behind the lens unit 11 and then the visible light blocking region of the hardware filter 12 is located behind the lens unit 11 for a while (for example, 1 ms).

The visibility distance measurement unit 19 can measure the visibility distance in front of the lens unit 11 on the basis of the pixel values of the color image generated by the ISP 14 in a state where the infrared light band of the light passing through the lens unit 11 is blocked and a visible light band thereof is allowed to pass therethrough by the hardware filter 12 every measurement period of the visibility distance. According to the method, since the color image is always generated by the ISP 14 every measurement period of the visibility distance of the visibility distance measurement unit 19, there is an advantage that the visibility distance is always accurately measured regardless of the visibility status in front of the lens unit 11. However, since the black-and-white image cannot be generated in a section in which the visibility distance is measured by the visibility distance measurement unit 19, there is a disadvantage that an image stop phenomenon can occur in a case where a previous black-and-white image is maintained during the section. In addition, since the hardware filter 12 moves frequently, there is a disadvantage that a lifetime of a drive system related to the movement of the hardware filter 12 can be shortened.

Next, a software method will be described as follows. The visibility distance measurement unit 19 can measure the visibility distance in front of the lens unit 11 by calculating a concentration of a factor reducing the visibility distance in front of the lens unit 11 on the basis of the pixel values of the color image generated by the ISP 14 in a state where the infrared light band of the light passing through the lens unit 11 is blocked and the visible light band thereof is allowed to pass therethrough by the hardware filter 12 and setting the visibility distance in front of the lens unit 11 in inverse proportion to the calculated concentration. For example, the visibility distance measurement unit 19 can subtract the concentration of the factor reducing the visibility distance in front of the lens unit 11 from a reference value of the visibility distance in front of the lens unit 11 and set the subtraction result as the visibility distance in front of the lens unit 11. If the reference value of the visibility distance in front of the lens unit 11 is too small, it can be measured that visibility is poor even though the visibility in front of the lens unit 11 is good, and if the reference value of the visibility distance in front of the lens unit 11 is too large, it can be measured that the visibility is good even though the visibility in front of the lens unit 11 is poor. The reference value of the visibility distance in front of the lens unit 11 is a value that can be changed in comparison with performance and the like of the lens unit 11 and is preferably set to a value at which the visibility distance in front of the lens unit 11 can be accurately determined through several tests.

The visibility distance measurement unit 19 can measure the visibility distance in front of the lens unit 11 by calculating a concentration of a factor reducing the visibility distance in front of the lens unit 11 on the basis of the pixel values of the black-and-white image generated by the ISP 14 in a state where the visible light band of the light passing through the lens unit 11 is blocked and the infrared light band thereof is allowed to pass therethrough by the hardware filter 12 and setting the visibility distance in front of the lens unit 11 in inverse proportion to a concentration obtained by adding a weighted value after the weighted value is added to the calculated concentration. Here, the weighted value means a difference in clearness between the color image and the black-and-white image generated by the ISP 14 under the condition that the visibility status in front of the lens unit 11 is the same. For example, the visibility distance measurement unit 19 can subtract a sum of the weighted value and the concentration of the factor reducing the visibility distance in front of the lens unit 11 from the reference value of the visibility distance in front of the lens unit 11 and set the subtraction result to the visibility distance in front of the lens unit (11).

More specifically, the visibility distance measuring unit 19 can calculate concentration of the factor reducing the visibility distance in front of the lens unit 11 from a change in brightness of the pixel values of the color image or the black-and-white image generated by the ISP 14 and at least one of the number of pixels representing an edge of object in the color image or the black-and-white image generated by the ISP 14. If the weather is clear and the visibility is good, the brightness of the pixel values of the image is abruptly changed as compared with a case where the visibility is poor, the edge of the object in the image becomes clear, and thereby, the number of pixels representing the edge of the object increases. For example, if the weather is clear and the visibility is good, a difference in brightness between the sky and the ground is clear, and the number of pixels representing a boundary between the sky and the ground increases. In contrast to this, if the visibility status is poor due to nighttime or a bad weather, the brightness of the pixel values of the image gradually changes and the edge of the object in the image is blurred as compared with the case where the visibility status is good, and thereby the number of pixels representing the edge of the object decreases. For example, as a fog density in front of the lens unit 11 increases, the difference in brightness between the pixel values of the image decreases and the number of pixels representing the edge of the object also decreases.

Figure 6:
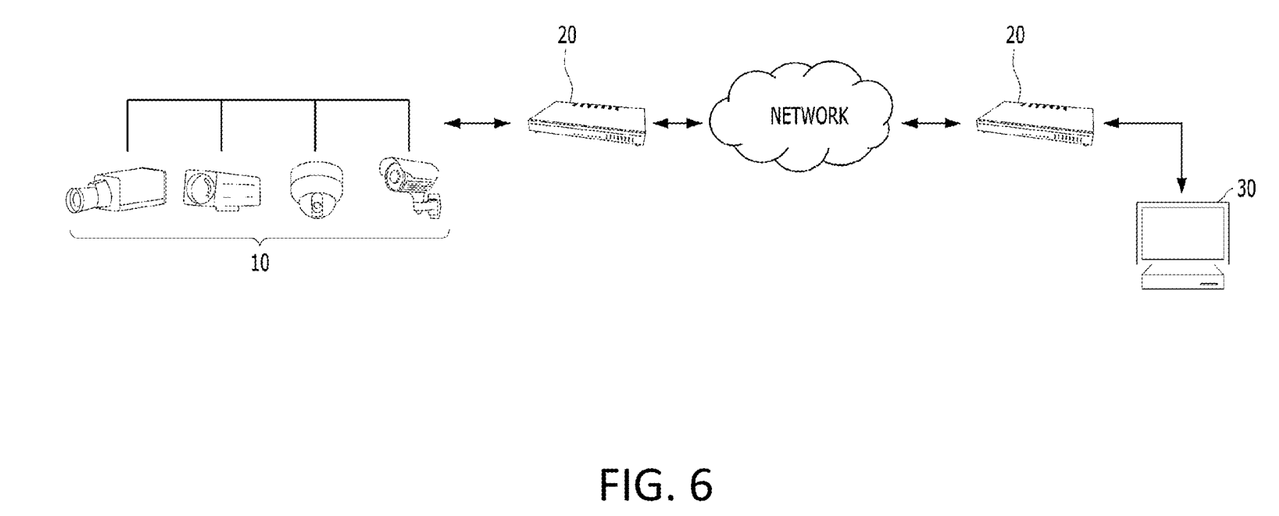
FIG. 6 is a configuration diagram of a video monitoring system to which the monitoring camera 10 illustrated in FIG. 1 is applied.

FIG. 6 is a configuration diagram of a video monitoring system to which the monitoring camera 10 illustrated in FIG. 1 is applied. Referring to FIG. 6, the video monitoring system according to the present embodiment is configured by a plurality of monitoring cameras 10 including the monitoring camera 10 illustrated in FIG. 1, a plurality of hubs 20, and a server 30. The plurality of monitoring cameras 10 are installed sporadically throughout monitoring regions and transmit images captured by the monitoring cameras 10 to the server 30 via the network according to the above-described embodiment. If the monitoring region is very narrow, only one monitoring camera 10 can be installed. The plurality of hubs 20 allow network communication between the plurality of monitoring cameras 10 and the server 30 by connecting the plurality of monitoring cameras 10 to the network and connecting the server 30 to the network.

The server 30 is installed in a Control center, receives the color image or the black-and-white image transmitted from the plurality of monitoring cameras 10 through the network, and displays the received color image or black-and-white image to a user. The server 30 can filter the color image or the black-and-white image transmitted from the monitoring camera 10 by removing a factor reducing the visibility distance in front of the lens unit 11 from the color image or the black-and-white image transmitted from the monitoring camera 10 according to a current visibility status in front of the lens unit 11 of the monitoring camera 10. Since a hardware performance of the server 30 is much better than a hardware performance of the monitoring camera 10, a high-capacity image filtering algorithm can be smoothly performed by the server 30. For example, even if the black-and-white image captured by the monitoring camera 10 at night or in a bad weather condition is filtered according to the fourth filtering level, clearness thereof can be insufficient. the server 30 can provide a user with a black-and-white image having clearness enough to identify a target object by applying a high-performance image filtering algorithm better than an image filtering algorithm executed by the monitoring camera 10 to the black-and-white image transmitted from the monitoring camera 10.

The present invention is described above with reference to preferred embodiments. It will be understood by those skilled in the art that the present invention may be embodied in changed forms without departing from the essential characteristics of the present invention. Therefore, the disclosed embodiments should be considered in a descriptive sense rather than a restrictive sense. The scope of the present invention is defined by the claims rather than by the foregoing description, and all differences within the scope of equivalents thereof should be construed as being included in the present invention.

The invention claimed is:

1. A monitoring camera having an autofocusing function based on a composite filtering method robust against a change in visibility status comprising:
   a lens unit that includes at least one lens;
   a hardware filter that blocks any one of an infrared light band and a visible light band of light passing through the lens unit and allows the other one to pass therethrough according to a current visibility status in front of the lens unit;
   an image sensor that converts the light passing through the hardware filter into an electrical signal;
   an ISP (Image Signal Processor) that generates a color image or a black-and-white image from a signal which is output from the image sensor according to a band of light which is emitted the hardware filter;
   a software filter that filters the color image or the black-and-white image which is generated by the ISP by removing a factor reducing a visibility distance in front of the lens unit from the color image or the black-and-white image which is generated by the ISP according to the current visibility status in front of the lens unit;
   an autofocusing unit that performs autofocusing of the lens unit using analysis of the color image which is generated by the ISP or performs the autofocusing of the lens unit using analysis of the color image or the black-and-white image which is filtered by the software filter depending on whether or not filtering of the software filter is performed; and
a control unit that controls a filtering band of the hardware filter and whether or not the filtering of the software filter is performed according to any one filtering level corresponding to the current visibility status in front of the lens unit among a plurality of filtering levels from which an image that is input to the autofocusing unit is determined according to the filtering band of the hardware filter and whether or not the filtering of the software filter is performed,
wherein the plurality of filtering levels include a first filtering level in which a color image that is output from the ISP is directly input to the autofocusing unit in a state where an infrared light band of light passing through the lens unit is blocked by the hardware filter, a second filtering level in which the color image that is output from the ISP is filtered by the software filter and then is input to the autofocusing unit in a state where the infrared light band of the light passing through the lens unit is blocked by the hardware filter, and a third filtering level in which the black-and-white image that is output from the ISP is filtered by the software filter and then is input to the autofocusing unit in a state where a visible light band of the light passing through the lens unit is blocked by the hardware filter.

2. The monitoring camera of claim 1, further comprising:
an actuator that moves a location of at least one lens of the lens unit under a control of the autofocusing unit,
wherein the autofocusing unit performs autofocusing using a method of analyzing a change in clearness of a color image or a black-and-white image filtered by the software filter while an operation of the actuator is controlled so that a distance between at least one lens of the lens unit and the image sensor is changed in a case where the color image or the black-and-white image generated by the ISP is filtered by the software filter, and determining a location of at least one lens of the lens unit at a moment when clearness of the color image or the black-and-white image filtered by the software filter is highest as a focusing location of the lens unit.

3. The monitoring camera of claim 1,
wherein, in the third filtering level, a black-and-white image that is filtered by the software filter is input to the autofocusing unit by using a method in which a predetermined image filtering algorithm for removing a factor reducing the visibility distance is applied to the black-and-white image which is output from the ISP, and
wherein the plurality of filtering levels further include a fourth filtering level in which an image that is filtered by the software filter is input to the autofocusing unit by using a method in which a luminance value of each pixel of the black-and-white image that is output from the ISP is inverted in a state where a visible light band of light passing through the lens unit is blocked by the hardware filter and the same image filtering algorithm as the predetermined image filtering algorithm is applied to the black-and-white image having the inverted luminance value.

4. The monitoring camera of claim 1, further comprising:
a visibility distance measurement unit that measures a visibility distance in front of the lens unit on the basis of pixel values of the color image or the black-and-white image which is generated by the ISP,
wherein the control unit selects any one of the filtering levels according to the visibility distance that is measured by the visibility distance measurement unit from among the first filtering level, the second filtering level, and the third filtering level and controls the filtering band of the hardware filter and whether or not the filtering of the software filter is performed.

5. The monitoring camera of claim 4,
wherein the control unit controls the filtering band of the hardware filter such that the hardware filter temporarily blocks the infrared light band of the light passing through the lens unit and allows the visible light band thereof to pass therethrough every measurement period of the visibility distance while the hardware filter blocks the visible light band of the light passing through the lens unit and allows the infrared light band thereof to pass therethrough, and
wherein the visibility distance measurement unit measures the visibility distance in front of the lens unit on the basis of the pixel values of the color image that is generated by the ISP in a state where the infrared light band of the light passing through the lens unit is blocked and the visible light band thereof is allows to pass therethrough by the hardware filter every measurement period of the visibility distance.

6. The monitoring camera of claim 4,
wherein the visibility distance measurement unit measures the visibility distance in front of the lens unit by calculating a concentration of a factor reducing the visibility distance in front of the lens unit on the basis of the pixel values of the color image which is generated by the ISP in a state where the infrared light band of the light passing through the lens unit is blocked and the visible light band thereof is allowed to pass therethrough by the hardware filter and setting the visibility distance in front of the lens unit in inverse proportion to the calculated concentration, and
wherein the visibility distance measurement unit measures the visibility distance in front of the lens unit by calculating the concentration of the factor reducing the visibility distance in front of the lens unit on the basis of the pixel values of the black-and-white image which is generated by the ISP in a state where the visible light band of the light passing through the lens unit is blocked and the infrared light band thereof is allowed to pass therethrough by the hardware filter, adding a weighted value to the calculated concentration, and setting the visibility distance in front of the lens unit in inverse proportion to the concentration to which the weighted value is added.

7. The monitoring camera of claim 1, further comprising:
a compression unit that compresses the color image generated by the ISP or compresses the color image or the black-and-white image filtered by the software filter depending on whether or not the filtering of the software filter is performed,
wherein the control unit controls the filtering band of the hardware filter and whether or not the filtering of the software filter is performed according to any one filtering level corresponding to the current visibility status in front of the lens unit among the plurality of filtering levels from which the image that is input to the compression unit and the autofocusing unit is determined according to the filtering band of the hardware filter and whether or not the filtering of the software filter is performed.

8. A video monitoring system comprising:
at least one monitoring camera including the monitoring camera according to claim 1; and
a server that displays a color image or a black-and-white image which is transmitted from the at least one monitoring camera through a network to the user.

\* \* \* \* \*